(No Model.)
F. L. BROWN.
APPARATUS FOR MAKING COFFEE.
No. 447,002. Patented Feb. 24, 1891.
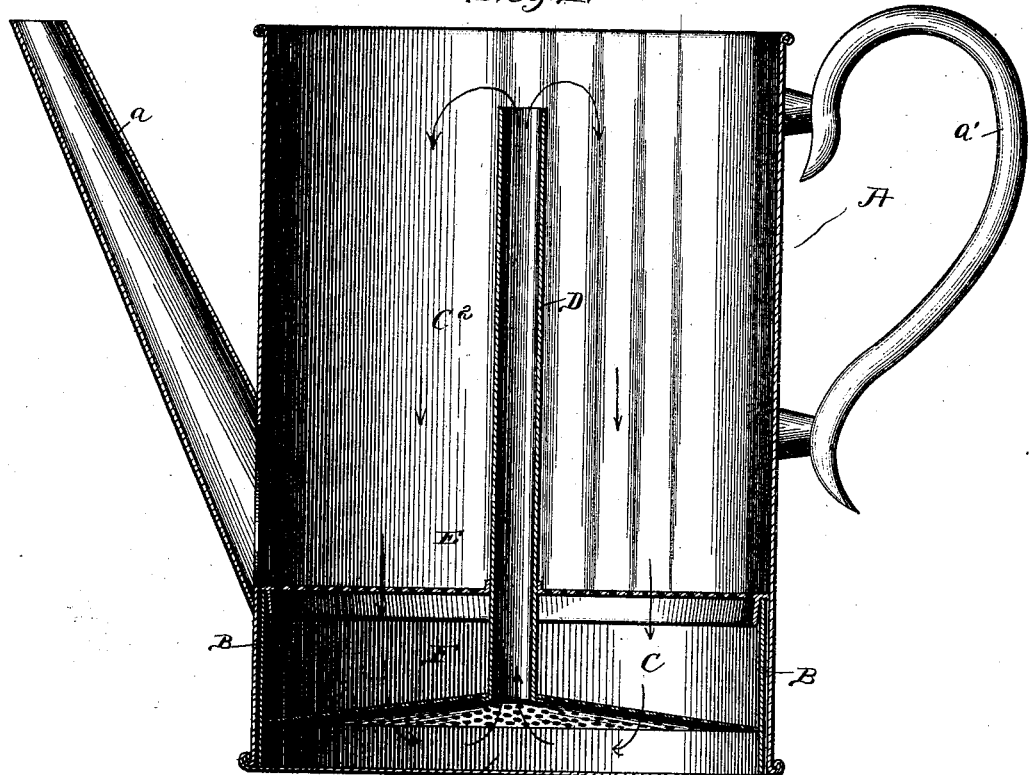
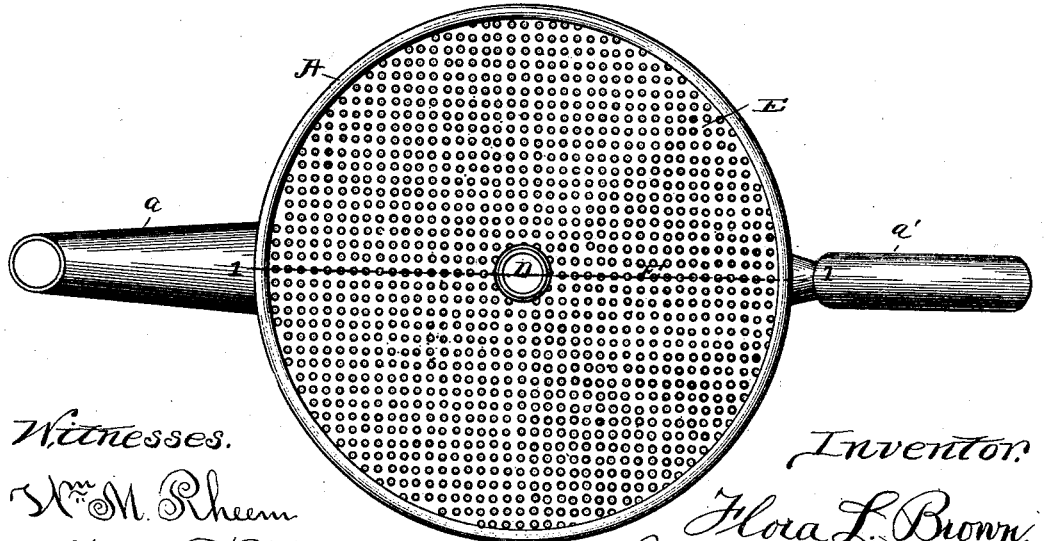
Witnesses.
Wm. M. Rheem
Alfred T. Townsend
Inventor.
Flora L. Brown,
By Charles T. Brown,
Atty.
THE NORRIS PETERS CO., PHOTO-LITHO., WASHINGTON, D. C.

UNITED STATES PATENT OFFICE.

FLORA L. BROWN, OF CHICAGO, ILLINOIS.

APPARATUS FOR MAKING COFFEE.

SPECIFICATION forming part of Letters Patent No. 447,002, dated February 24, 1891.

Application filed July 2, 1890. Serial No. 357,560. (No model.)

*To all whom it may concern:*

Be it known that I, FLORA L. BROWN, a citizen of the United States, residing at Chicago, in the county of Cook and State of Illinois, have invented certain new and useful Improvements in Apparatus for Making Coffee, of which the following is a description.

The purpose of my invention is to obtain a coffee-pot adapted for ordinary household use which can be easily kept clean and in which the coffee-berry roasted and ground in suitable form can be contained, so that no portion of such coffee-berries shall be found in the coffee made therefrom; to obtain a coffee-pot in which such berries, although contained in a receptacle placed within a larger receptacle, shall be subjected to the influence of water sufficiently heated to quickly make coffee therefrom, and in which the aroma or flavor of the berries shall be retained; to obtain a coffee-pot in which such berries, although contained, as stated, in a separate receptacle placed in a larger receptacle, shall be subjected to a constant current of liquid passing through them, from and of which liquid the coffee is to be made, in a manner to extract from such berries the essence or, as it is usually termed, the "strength" thereof.

I am aware that coffee-pots have been heretofore made in which the roasted and ground coffee-berry is contained in a receptacle having perforated walls or constructed of wire-netting and placed above the liquid in the coffee-pot, or in a second receptacle placed above the receptacle containing such liquid and having a bottom composed of wire-netting or other perforated metal, and in which the liquid it is proposed to convert into "coffee," as it is termed, has been forced from the main body of the liquid above the coffee-berry contained therein and allowed to percolate through it, the drip therefrom falling into the receptacle containing the main body of liquid, but I am not aware that any coffee-pot has been heretofore made for making coffee wherein the roasted or ground berry is placed in a receptacle constructed wholly or partially of wire-netting or perforated metal walls, and with which a constant current of liquid—as water—is automatically forced or drawn through such berry so contained in such second receptacle by the action of heat applied to the contents of the coffee-pot when the same is placed upon a fire; and, further, I am not aware of any coffee-pot having been heretofore constructed wherein the roasted or ground coffee-berries have been placed near to but not in contact with the bottom of the receptacle containing the liquid to be converted into coffee and in such place that said roasted and ground coffee-berries will be subjected to sufficient heat to quickly make coffee which at the same time shall not be burned.

I have illustrated my invention by the drawings accompanying and forming a part of this application, in which—

Figure 1 is a sectional elevation on line 1 1 of Fig. 2, with the cover of the outer receptacle removed. Fig. 2 is a plan view of the same.

Like letters refer to like parts throughout the several views.

A is the coffee-pot. $a$ is the spout, and $a'$ the handle thereof.

B is a ring of sheet metal, preferably tin.

C is a partition composed of wire-gauze or perforated sheet metal. Partition C is preferably slightly inclined upward from its point of contact and attachment to the ring B to the center, and forms the bottom of the receptacle for containing the roasted and ground coffee-berries.

D is a pipe composed of sheet metal, extending from the apex of the cone-shaped perforated partition C.

C' is a chamber formed underneath this partition C, when the ring B, partition C, and pipe D, which are all attached together, are placed within the receptacle A, and resting upon the bottom thereof. A free way or channel is formed by and through such pipe D from part C' to part $C^2$ of coffee-pot A.

E is a cover composed of wire-gauze or perforated sheet metal and having a hole in the center thereof through which pipe D may pass. This cover E rests on the ring B, and F is a receptacle formed thereby, in which are placed the roasted and ground coffee-berries.

The method of operation of my device is as follows: Coffee is placed in receptacle F and cover E closed tightly over such receptacle. The receptacle F, composed, as described, of ring B, perforated cone-shaped bottom C, pipe D, and cover E, is then placed in the coffee-pot A. Water or other liquid (as water and milk or cream) is poured into the coffee-pot A in a heated or cool condition, as preferred. The coffee-pot is then placed over a suitable fire, and heat is applied to the bottom thereof. It is evident that when the liquid is poured, as described, into the coffee-pot A, a portion of such liquid will pass through the perforations of the cover E and bottom C of coffee-receptacle F, and will be contained in chamber C' underneath said receptacle and in pipe D, the liquid in such pipe D being of the same height as the liquid contained in part $C^2$ of the coffee-pot. When the liquid in part $C^2$ of the coffee-pot extends above the top of pipe D, such pipe will of course be filled thereby. As sufficient heat is applied under the coffee-pot, steam is formed from the liquid contained in chamber C', and as such steam expands, the liquid contained in the pipe D is elevated through such pipe and falls over into part $C^2$ of the coffee-pot. As the liquid is elevated through and falls from pipe D onto the upper surface of the liquid in the outer receptacle and mingles with such liquid, a like amount of the liquid in the outer receptacle and that portion thereof directly over the perforated top of the coffee-grounds receptacle will go through the perforations of the top and bottom of receptacle F, and entering into chamber C' will be forced up through pipe D and fall out from over the top thereof. The constant current or circulation of hot water thus passing downward through the roasted and ground coffee-berries in receptacle F, in combination with the heat applied thereto from the under side thereof, very quickly and thoroughly extracts from said roasted and ground coffee-berries all or a very large amount of the extract or strength contained in said coffee-berries, while at the same time the layer of wetted, roasted, and ground coffee-berries in the receptacle F form a heat-obstructing medium, tending to retain in chamber C' the heat imparted thereto from below, and such heat so retained quickly converts the whole or a portion of the liquid in such chamber into steam or vapor.

It is evident that the exact form of the receptacle F herein illustrated need not necessarily be retained, as any receptacle having perforated top and bottom walls, the lower of such walls forming the bottom thereof, and the top of a chamber extending underneath such receptacle with a pipe extending from such chamber through the coffee-receptacle and to above its perforated top, thereby subjecting the coffee-grounds to the same process as in a construction of the precise shape illustrated and described, will be the equivalent thereof.

Having thus described my invention, what I claim, and desire to secure by Letters Patent of the United States, is—

1. In an apparatus for making coffee, an inner receptacle adapted to hold ground coffee-berries and to fit into an outer receptacle, such inner receptacle being composed of a sheet-metal ring one edge of which is adapted to rest upon the upper surface of the bottom of the outer receptacle, a partition attached to the ring a short distance from the lower edge thereof and extending therefrom inward to a vertical pipe which passes through such partition and is secured therein, such partition having perforations therein and forming the bottom of the coffee-berry receptacle, and a cover, also composed of perforated metal, adapted to rest upon the upper edge of the metal ring and to have such vertical pipe extend through it and upward in the liquid in the outer receptacle, all substantially as described.

2. In an apparatus for making coffee, the combination of an outer receptacle adapted to hold liquid with an inner receptacle adapted to hold ground coffee-berries, such inner receptacle fitting into the outer receptacle and composed of a sheet-metal ring, one edge of which rests upon the upper surface of the bottom of the outer receptacle, a cone-shaped partition attached to the ring a short distance from the lower edge thereof and extending therefrom upward and inward to a vertical pipe which passes through such cone-shaped partition and is secured therein, such partition having perforations therein and forming the bottom of the coffee-berry receptacle, and a cover, also composed of perforated metal, adapted to rest upon the upper edge of the metal ring and to have such vertical pipe extend through it and to near the top of the outer receptacle, all substantially as described.

FLORA L. BROWN.

Witnesses:
CHARLES T. BROWN,
CALVIN C. MARCH.